H. W. SCHATZ.
VARIABLE SPEED MECHANISM.
APPLICATION FILED FEB. 23, 1909.
948,025.
Patented Feb. 1, 1910.
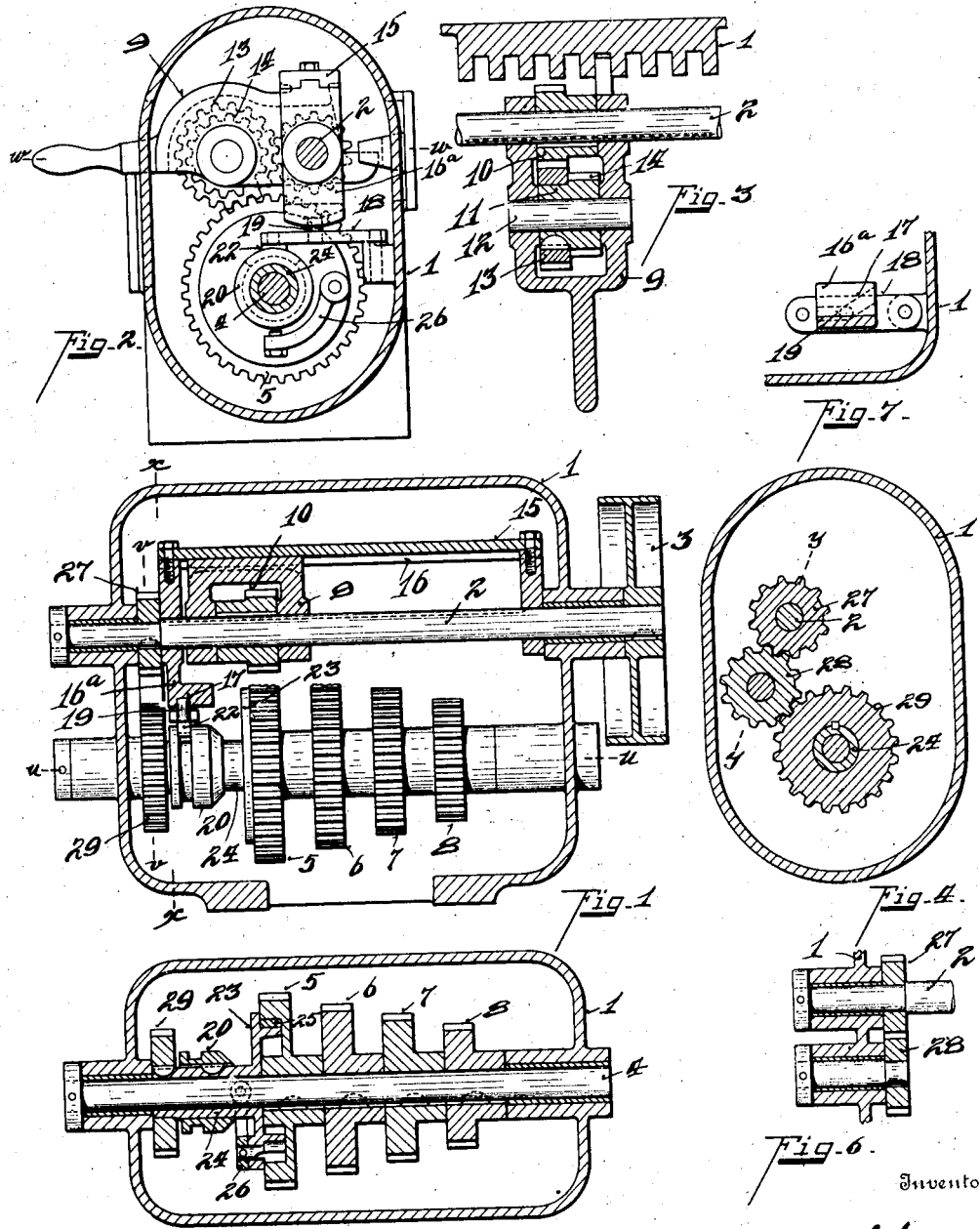
Witnesses
Oliver B. Kaiser
Robert Graf
Inventor
Herman W. Schatz
By
Wood & Wood
Attorneys

UNITED STATES PATENT OFFICE.

HERMAN W. SCHATZ, OF CINCINNATI, OHIO, ASSIGNOR TO THE AMERICAN TOOL WORKS COMPANY, OF CINCINNATI, OHIO, A CORPORATION OF WEST VIRGINIA.

VARIABLE-SPEED MECHANISM.

948,025.  Specification of Letters Patent.  Patented Feb. 1, 1910.

Application filed February 23, 1909. Serial No. 479,500.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to an improvement in variable speed device.

The object of my invention is to provide a variable speed device of the cone and tumbler type with means for throwing the driven shaft into driving relation with the driving shaft, simultaneous with the disengagement of the tumbler gear from any one of the members of the cone.

Another object of my invention is to provide a clutch actuating frame in connection with the tumbler lever, whereby the tumbler lever will actuate the frame during its swinging operation in bringing its tumbler gear into and out of engagement with one of the members of a cone of gears with means for maintaining the tumbler lever and clutch actuating frame in positive connection irrespective of the lateral shifting of the tumbler.

Another object of my invention is to provide a tumbler lever with a compound tumbler gear, each of the gears being adapted to be selectively engaged with any member of a cone of gears.

The features of the invention are more fully set forth in the description of the accompanying drawings, forming a part of this specification, in which:—

Figure 1 is a central vertical section through the tumbler lever showing driven shaft in elevation. Fig. 2 is a section on line *x, x*, Fig. 1. Fig. 3 is a section on line *w, w*, Fig. 2. Fig. 4 is a section on line *v, v*, Fig. 1. Fig. 5 is a section on line *u, u*, Fig. 1. Fig. 6 is a section on line *y, y*, Fig. 4. Fig. 7 is a top plan view of the clutch shifting lever pivotally connected to the main frame.

The principal feature of my invention is to provide a variable speed device of the cone and tumbler type with means for bringing the driven shaft into driving relation with the driving shaft, after the tumbler has been disengaged from one of the members of the cone of gears for imparting a direct drive between driving and driven shafts. Further, imparting motion to the driven shaft which enables a quick shifting of the tumbler from one gear of the cone to another during the operation of the device.

1 represents the frame.

2 represents the driving shaft provided with a driving pulley 3.

4 represents a driven shaft provided with a series of step gears 5, 6, 7, 8, suitably spaced from each other forming the members of a cone of gears.

9 represents a tumbler lever carrying a gear 10 splined upon shaft 2.

11 represents a compound tumbler gear loose on stud shaft 12 with the member 13 in mesh with gear 10. The gear members 13 and 14 are adapted to be selectively engaged with either one of the gears 5, 6, 7 or 8, whereby two changes of speed may be imparted to shaft 4 with each one of the gears of the step.

15 represents a frame pivotally supported upon shaft 2, provided with an elongated tongue 16 engaging into a groove formed upon the tumbler lever 9, whereby as the tumbler lever is actuated it will rock the frame 15, at the same time permitting of a lateral movement of the tumbler lever. The frame 15 is provided with a downwardly depending arm $16^a$, provided with a cam groove 17.

18 represents a clutch shifting lever provided with a pin 19 engaging with the cam groove 17.

20 represents a clutch actuating collar provided with a groove into which the yoke 22 engages, said yoke being pivoted to the lever 18.

23 represents the friction clutch member having a sleeve 24 upon which the collar 20 is splined.

25 represents a friction ring actuated by the arm 26, locking the same to the gear 5. The friction clutch may be constructed in any well known manner and does not form a feature of my invention, as any form of clutch, friction or otherwise, may be employed for engaging the sleeve 24 with gear 5 or shaft 4.

27 represents a gear fixed to shaft 2 in mesh with an intermediate gear 28, said intermediate gear being in mesh with a gear 29 fixed to the sleeve 24.

Thus it will be seen that when the tumbler lever 9 is swung upward to disengage the compound gear from any member of the step of gears the frame 15 will be rocked actuating the lever 18, shifting the collar 20, locking the sleeve 24 to shaft 4, whereby motion will be imparted to shaft 4, through gears 27, 28 and 29, forming an operative connection between shafts 2 and 4. The cam groove 17 is formed so as to disengage the clutch from driving connection with shaft 4 in advance of engagement with the tumbler gears.

Having described my invention, I claim:—

1. In a variable speed device of the cone and tumbler type, a driving shaft, a driven shaft, a train of gears between said shafts, a tumbler lever, clutching devices for connecting said train of gears in driving relation with said driven shaft, and means in connection with said tumbler lever and clutching devices for actuating said clutching devices through the actuation of said tumbler lever, substantially as described.

2. In a variable speed device of the cone and tumbler type, a first shaft, a second shaft, driving connection between said shafts, a tumbler lever, and means for bringing said driving connection into and out of driving relation with said shaft simultaneous with the actuation of said tumbler lever, substantially as described.

3. In a variable speed device of the cone and tumbler type, a driving shaft, a driven shaft, a train of gears between said driving and driven shafts, clutching devices for clutching one gear of said train to said driven shaft, a tumbler lever, a rocking frame in connection with said tumbler lever and clutching devices, whereby the swinging of said tumbler lever will simultaneously actuate said rocking frame and clutching devices, substantially as described.

4. In a variable speed device, a first shaft, a second shaft, a series of step gears upon the second shaft, a tumbler lever and gear slidable upon said first shaft, a compound tumbler gear carried by said tumbler lever, each member adapted to be engaged with any one of the step gears, in combination with a train of gears between said first and second shafts, clutching devices for connecting said train in driving relation with said second shaft, and means in connection with said tumbler lever and clutching devices for actuating said clutching devices through the actuation of said tumbler lever, whereby two changes of speed may be imparted for each step of the series and one direct drive, substantially as described.

5. In a variable speed device, a first shaft, a second shaft, a tumbler lever and gearing between said first and second shafts for imparting varying speeds to said second shaft, a train of gears between the first and second shafts, and means actuated by said tumbler lever for throwing said train of gears into driving relation with said first and second shafts upon disengagement of the driving connection of the tumbler lever gearing between said shafts and vice versa, substantially as described.

6. In a variable speed device, a first shaft, a second shaft, a train of gears between said shafts in constant engagement, a series of gears on said second shaft, a tumbler lever slidable on the first shaft, gearing carried thereby in driving connection with said first shaft, adapted to be thrown in train with any one of the series of gears on said second shaft, and means actuated by said tumbler lever for controlling the driving connection of said constantly engaged gears.

In testimony whereof, I have hereunto set my hand.

HERMAN W. SCHATZ.

Witnesses:
OLIVER B. KAISER,
ROBERT GRAF.